M. H. McCOY.
NUT LOCK.
APPLICATION FILED JAN. 25, 1909.
940,267.
Patented Nov. 16, 1909.
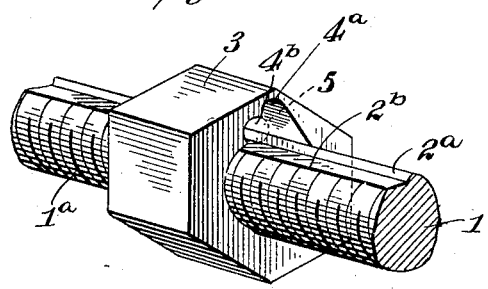
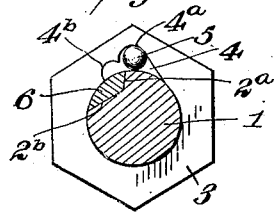
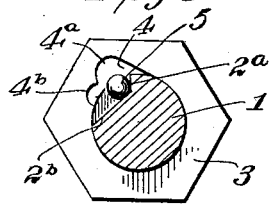
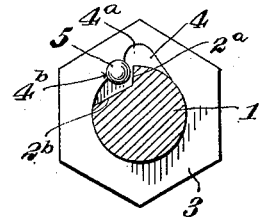
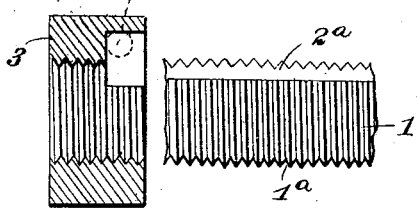
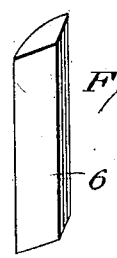
Inventor
M. H. McCoy,
Witnesses
Cora K. Handy
W. N. Woodson
By R. H. Macey, Attorneys.

UNITED STATES PATENT OFFICE.

MILES H. McCOY, OF COSHOCTON, OHIO, ASSIGNOR OF ONE-HALF TO WILLIAM H. DEAN, OF COSHOCTON, OHIO.

NUT-LOCK.

940,267. Specification of Letters Patent. Patented Nov. 16, 1909.

Application filed January 25, 1909. Serial No. 474,187.

*To all whom it may concern:*

Be it known that I, MILES H. McCoy, citizen of the United States, residing at Coshocton, in the county of Coshocton and State of Ohio, have invented certain new and useful Improvements in Nut-Locks, of which the following is a specification.

The present invention relates to certain new and useful improvements in nut locks, and the object of the invention is the provision of a device of this character embodying a novel construction for preventing the nut from working loose under the influence of shocks or vibrations.

The invention further contemplates a nut lock which is simple and inexpensive in its construction, which operates in a positive manner to prevent any accidental backward turning of the nut after it has once been screwed in position, but admits of the nut being readily removed from the bolt without injury to either of the members, when desired.

For a full understanding of the invention and the merits thereof and also to acquire a knowledge of the details of construction and the means for effecting the result reference is to be had to the following description and accompanying drawings, in which:

Figure 1 is a perspective view of a nut lock embodying the invention; Fig. 2 is a transverse sectional view showing the roller in the position assumed when the nut is being screwed in position; Fig. 3 is a similar view showing the position of the ball at the initial backward movement of the nut; Fig. 4 is a similar view showing the position assumed by the ball when the nut is locked in position; Fig. 5 is a longitudinal sectional view through the nut and a side elevation of a portion of the bolt, the members being separated; Fig. 6 is an enlarged detail view of the pin which is inserted in the groove of the bolt when it is desired to remove the nut.

Corresponding and like parts are referred to in the following description and indicated in all the views of the drawings by the same reference characters.

Specifically describing the embodiment of the invention illustrated on the drawing, the numeral 1 designates a bolt which is of the usual construction and is threaded at one end as indicated at $1^a$. Extending longitudinally along the threaded portion of the bolt is a groove which is preferably formed with a substantially radial wall $2^a$ and an inclined wall $2^b$ which intersects the radial wall. A nut 3 is designed to be threaded upon the bolt 1 in the usual manner and the interior of this nut is formed with a recess 4 which faces the threaded portion of the bolt. The base of this recess is formed with a pair of depressions which are located at opposite ends thereof, the depression indicated at $4^a$ being somewhat deeper than the depression indicated at $4^b$.

As shown on the drawing, the recess 4 extends inwardly from one end of the nut but terminates short of the opposite end of the nut, such a construction admitting of a roller or ball 5 being readily inserted in the recess. This roller 5 is of such a size that when the nut 3 is turned in one direction it is shifted into the depression $4^a$ and entirely housed within the recess, thereby admitting of the nut turning freely upon the bolt. However, when the nut is turned in the opposite direction the roller is shifted into the shallow depression $4^b$ and projects into the bolt receiving opening of the nut so as to engage the radial wall $2^a$ of the longitudinal groove in the bolt and lock the nut against turning in the said direction.

When it is desired to remove the nut from the bolt the nut is first screwed inwardly a slight distance so as to cause the inclined wall $2^b$ of the groove in the bolt to force the roller into the depression $4^a$ of the recess in the nut. A pin such as that indicated at 6 is then inserted in the longitudinal groove of the bolt, the said pin serving to prevent the roller from entering the groove when the nut is turned and enabling the nut to be removed from the bolt without injuring either of the members.

Particular attention is directed to the fact that when the roller is engaged by the shallow depression $4^b$ and the radial wall $2^a$ of the recess in the nut, it is securely locked in position and cannot be displaced by shaking the bolt or by shocks or vibrations to which it may be subjected.

Having thus described the invention, what is claimed as new is:

In a nut lock, the combination of a threaded bolt formed with a longitudinally extending groove, one wall of which is relatively small and radially disposed, while the opposite wall is angularly disposed relative to the radial wall and of greater width than the radial wall, and a nut having an opening by which it is adapted to screw on the bolt, the nut being formed with a recess produced by two distinct and contiguous depressions, one of which has a substantially straight wall merging into the bolt-receiving opening of the nut, and a ball mounted in said recess, the two depressions of the recess being both shaped to snugly fit the ball, and the depression with the substantially straight wall being relatively deeper than the other depression, whereby in the movement of the nut on the bolt in the direction to screw the nut up against the work, the inclined wall of the groove in the bolt and the straight wall of the relatively large depression will easily move the ball out into the far end of the deeper depression so as to permit the easy movement of the nut in such direction, and whereby the opposite movement of the nut will permit the ball to drop into the relatively shallow depression and engage with the radial wall of the groove in the bolt so as to prevent the unscrewing movement of the nut.

In testimony whereof I affix my signature in presence of two witnesses.

MILES H. McCOY. [L. s.]

Witnesses:
WALTER L. THOMPSON,
R. DUMERMUTH.